United States Patent
Wu et al.

(10) Patent No.: US 11,546,799 B2
(45) Date of Patent: Jan. 3, 2023

(54) PACKET DUPLICATION

(71) Applicant: Nokia Technologies Oy, Espoo (FI)

(72) Inventors: Chunli Wu, Beijing (CN); Samuli Turtinen, Ii (FI); Benoist Sebire, Tokyo (JP); Ping-Heng Kuo, London (GB); Dawid Koziol, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 5 days.

(21) Appl. No.: 17/034,084

(22) Filed: Sep. 28, 2020

(65) Prior Publication Data

US 2021/0099911 A1    Apr. 1, 2021

(30) Foreign Application Priority Data

Sep. 30, 2019 (WO) ................ PCT/CN2019/109491

(51) Int. Cl.
*H04W 28/06* (2009.01)
*H04W 72/04* (2009.01)

(52) U.S. Cl.
CPC ..... *H04W 28/065* (2013.01); *H04W 72/0453* (2013.01)

(58) Field of Classification Search
CPC ............ H04W 72/0453; H04W 28/065; H04L 49/9057; H04L 69/32
See application file for complete search history.

(56) References Cited

U.S. PATENT DOCUMENTS

| | | | |
|---|---|---|---|
| 2018/0279262 A1 | 9/2018 | Babaei et al. | |
| 2018/0368107 A1 | 12/2018 | Babaei et al. | |
| 2018/0368132 A1 | 12/2018 | Babaei et al. | |
| 2019/0393989 A1* | 12/2019 | Jung | H04L 1/08 |
| 2020/0120569 A1* | 4/2020 | Baek | H04W 12/10 |
| 2020/0196195 A1 | 6/2020 | Tang | |

FOREIGN PATENT DOCUMENTS

| | | |
|---|---|---|
| CN | 105744626 A | 7/2016 |
| CN | 110166201 A | 8/2019 |
| EP | 3985905 A1 | 4/2022 |

(Continued)

OTHER PUBLICATIONS

"LCH-to-cell Restriction for CA Duplication Deactivation", 3GPP TSG-RAN WG2 Meeting #107, R2-1909874, Apple, Aug. 26-30, 2019, 4 pages.

(Continued)

*Primary Examiner* — Pankaj Kumar
*Assistant Examiner* — Eric Phu
(74) *Attorney, Agent, or Firm* — Alston & Bird LLP

(57) ABSTRACT

An apparatus is provided in a communications device. The apparatus comprises at least one processor and at least one memory including computer code for one or more programs. The at least one memory and the computer code are configured, with the at least one processor, to cause the apparatus to determine that at least one of a plurality of logical channels configured for packet duplication is to be deactivated; and determine an allocation of one or more cells associated with the at least one deactivated logical channel to one or more active logical channels of said plurality of logical channels configured for packet duplication.

20 Claims, 7 Drawing Sheets

(56) References Cited

FOREIGN PATENT DOCUMENTS

| WO | 2018/227625 A1 | 12/2018 |
|---|---|---|
| WO | WO 2019/019122 A1 | 1/2019 |
| WO | 2019/136653 A1 | 7/2019 |
| WO | 2019/137182 A1 | 7/2019 |
| WO | 2019/139319 A1 | 7/2019 |
| WO | 2020/061769 A1 | 4/2020 |
| WO | 2020/089451 A1 | 5/2020 |

OTHER PUBLICATIONS

"LCH-to-cell Restriction for CA Duplication Deactivation", 3GPP TSG-RAN WG2 Meeting #107, R2-1909873, Apple, Aug. 26-30, 2019, 3 pages.

"Email Discussion Report for [106#55][NR/IIOT] Network Control of PDCP Duplication Enhancements", 3GPP TSG-RAN WG2 #107, Tdoc R2-1909939, Agenda : 11.7.4, Ericsson, Aug. 26-30, 2019, pp. 1-30.

"LCP Restriction for Duplication with upto 4 Legs", 3GPP TSG-RAN WG2 Meeting 107, R2-1910371, Agenda 11.7.4, Huawei, Aug. 26-30, 2019, 2 pages.

International Search Report and Written Opinion received for corresponding Patent Cooperation Treaty Application No. PCT/CN2019/109491, dated Jun. 23, 2020, 9 pages.

Extended European Search Report received for corresponding European Patent Application No. 20197968.9, dated Jan. 29, 2021, 8 pages.

"Scenarios For Dynamic Activation", 3GPP TSG-RAN WG2 #106, Tdoc R2-1906853, Agenda: 11.7.4, Ericsson, May 13-17, 2019, 6 pages.

Apple et al., "Clarification on LCH-To-Cell Restriction", 3GPP TSG-RAN WG2 Meeting #104, Change Request 0535, R2-1816680, (Nov. 12-16, 2018), 3 pages.

Apple, "LCH-To-Cell Restriction for CA Duplication Deactivation", 3GPP TSG-Ran WG2 Meeting #107, Change Request 0653, R2-1909873, (Aug. 26-30, 2019), 3 pages.

Ericsson, "Scenarios for Dynamic Activation", 3GPP TSG-RAN WG2 #106, R2-1906853, (May 13-17, 2019), 6 pages.

Huawei et al., "Interaction Between PDCP/RLC/MAC for Packet Duplication" 3GPP TSG RAN WG2 Meeting #98, R2-1704836, (May 15-19, 2017), 3 pages.

Huawei et al., "LCP Restriction for Duplication With Up To 4 Legs", 3GPP TSG-RAN WG2 Meeting #106, R2-1906511, (May 13-17, 2019), 2 pages.

LG Electronics, Inc., "Clarification on LCH-To-Cell Restriction for PDCP Duplication", 3GPP TSG-RAN WG2 Meeting #104, Change Request 0569, R2-1818056, (Nov. 12-16, 2018), 2 pages.

Nokia et al., "PDCP Duplication with NR-DC/CA Combination", 3GPP TSG-RAN WG2 Meeting #106, R2-1906193, (May 13-17, 2019), 3 pages.

Nokia, "Stage-2 Running CR for Support of NR Industrial IoT WI", 3GPP TSG-RAN WG2 Meeting #107, Change Request, R2-1908168, (Aug. 26-30, 2019), 8 pages.

ZTE, "Consideration on the Activation/Deactivation of Data Duplication for CA", 3GPP TSG-RAN WG2 Meeting #98, R2-1704660, (May 15-19, 2017), 3 pages.

ZTE, "Consideration on the BSR for Data Duplication", 3GPP TSG-RAN WG2 Meeting #98, R2-1704665 , (May 15-19, 2017), 3 pages.

First Examination Report for Indian Application No. 202227024282 dated Sep. 19, 2022, 7 pages.

* cited by examiner

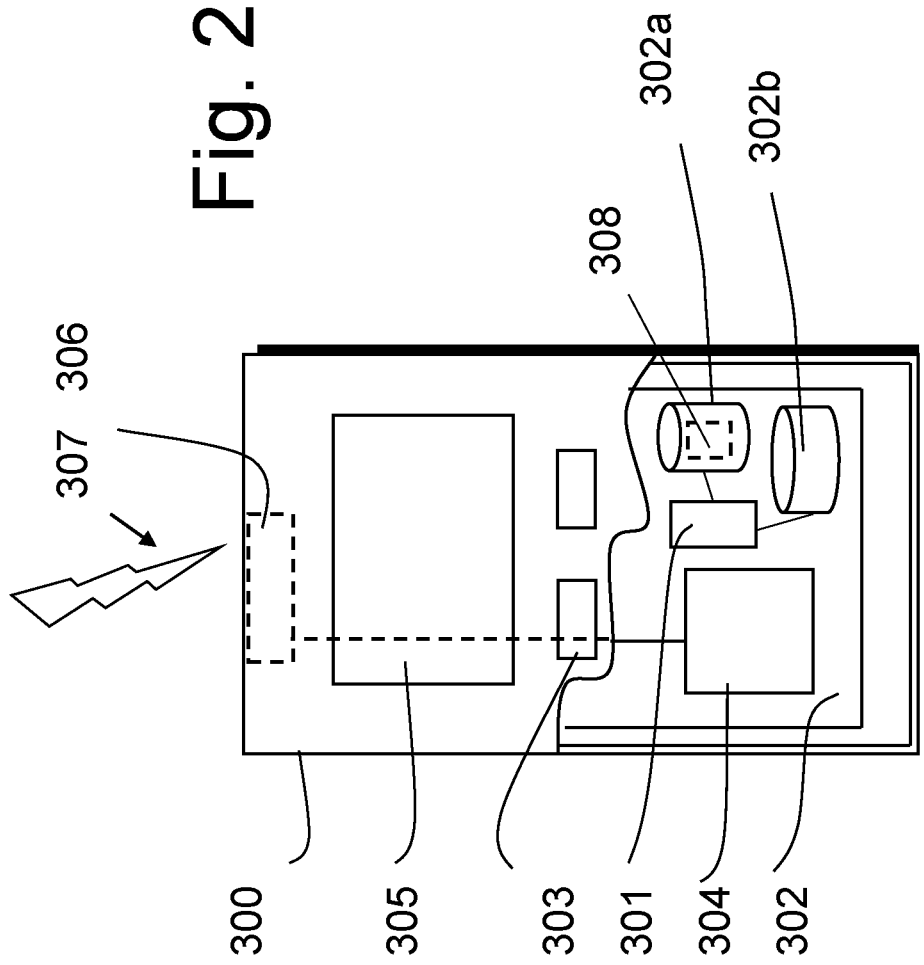

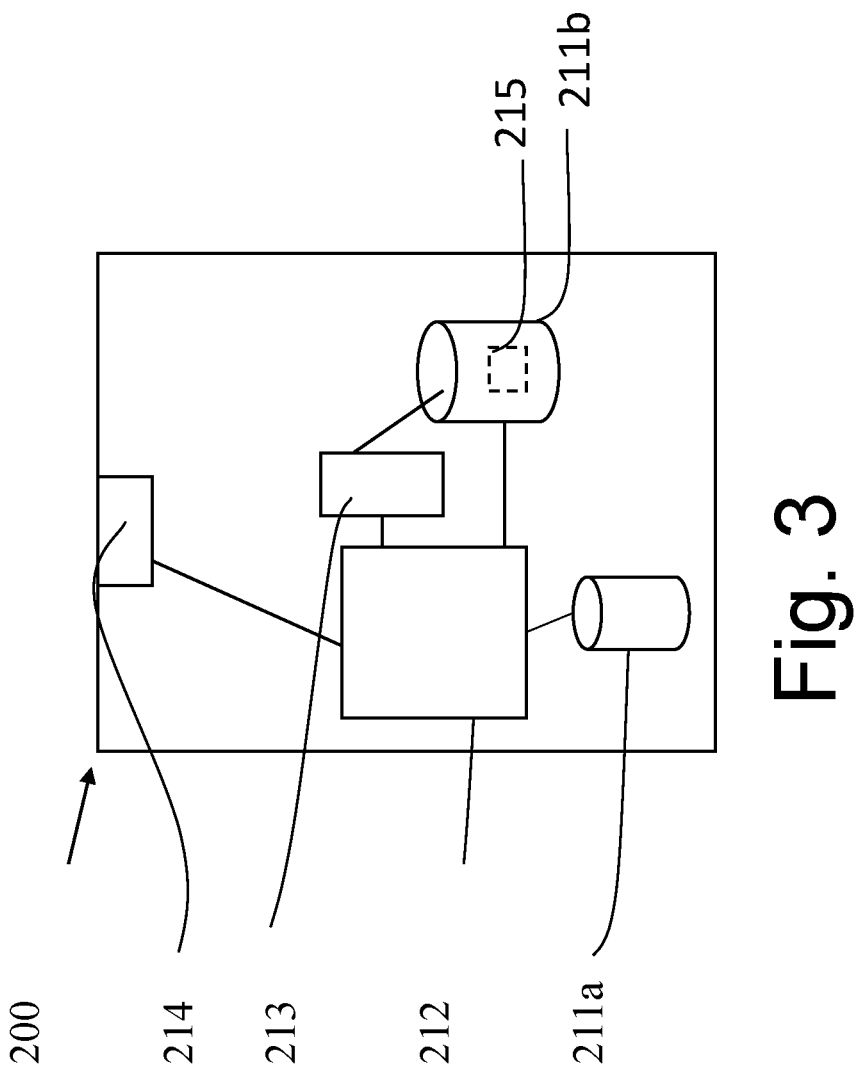

PACKET DUPLICATION

RELATED APPLICATION

This application claims priority from PCT Application No.: PCT/CN2019/109491 filed on Sep. 30, 2019, which is hereby incorporated in its entirety.

FIELD OF THE DISCLOSURE

The present disclosure relates to an apparatus, a method, and a computer program and in particular but not exclusively for apparatus, methods and computer programs for use in packet duplication scenarios.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided an apparatus provided in a communications device, said apparatus comprising at least one processor and at least one memory including computer code for one or more programs, the at least one memory and the computer code configured, with the at least one processor, to cause the apparatus at least to: determine that at least one of a plurality of logical channels configured for packet duplication is to be deactivated; and determine an allocation of one or more cells associated with the at least one deactivated logical channel to one or more active logical channels of said plurality of logical channels configured for packet duplication.

The active logical channel may be associated with an active radio link control entity. The active logical channel may be associated with an active leg. The at least one memory and the computer program code may be configured to, with the at least one processor, cause the apparatus at least to determine the allocation using one or more preconfigured rules. The at least one memory and the computer program code may be configured to, with the at least one processor, cause the apparatus at least to receive the one or more preconfigured rules from a base station.

The at least one memory and the computer program code may be configured to, with the at least one processor, cause the apparatus at least to allocate the one or more cells associated with the deactivated logical channel to a primary logical channel of the plurality of logical channels configured for packet duplication.

The at least one memory and the computer program code may be configured to, with the at least one processor, cause the apparatus at least to allocate the one or more cells associated with the deactivated logical channel to one or more active logical channels in dependence on a logical channel index of at least one of said plurality of logical channels configured for packet duplication.

The at least one memory and the computer program code may be configured to, with the at least one processor, cause the apparatus at least to allocate the one or more cells associated with the deactivated logical channel to:
a. an active logical channel with a highest logical channel index;
b. an active logical channel with a lowest logical channel index;
c. an active logical channel with a next highest logical channel index to that of the deactivated logical channel; or
d. an active logical channel with a next lowest logical channel index to that of the deactivated logical channel.

The at least one memory and the computer program code may be configured to, with the at least one processor, cause the apparatus at least to allocate the one or more cells associated with the deactivated logical channel to an active logical channel with a highest logical channel index.

The at least one memory and the computer program code may be configured to, with the at least one processor, cause the apparatus at least to allocate the one or more cells associated with the deactivated logical channel to an active logical channel with a lowest logical channel index.

The at least one memory and the computer program code may be configured to, with the at least one processor, cause the apparatus at least to allocate the one or more cells associated with the deactivated logical channel to an active logical channel with a next highest logical channel index to that of the deactivated logical channel.

The at least one memory and the computer program code may be configured to, with the at least one processor, cause the apparatus at least to allocate the one or more cells associated with the deactivated logical channel an active logical channel with a next lowest logical channel index to that of the deactivated logical channel.

The at least one memory and the computer program code may be configured to, with the at least one processor, cause the apparatus at least to allocate the one or more cells associated with the deactivated logical channel to one or more active logical channels in dependence on activity associated with one or more active logical channels of said plurality of logical channels configured for packet duplication.

The at least one memory and the computer program code may be configured to, with the at least one processor, cause the apparatus at least to allocate the one or more or more cells associated with the deactivated logical channel to:
a. an active logical channel associated with a most queued buffer;
b. an active logical channel associated with a least queued buffer;
c. an active logical channel associated with a highest sequence number of a packet; or
d. an active logical channel associated with a lowest sequence number of a packet.

The at least one memory and the computer program code may be configured to, with the at least one processor, cause the apparatus at least to allocate the one or more or more cells associated with the deactivated logical channel to an active logical channel associated with a most queued buffer.

The at least one memory and the computer program code may be configured to, with the at least one processor, cause the apparatus at least to allocate the one or more or more cells associated with the deactivated logical channel to an active logical channel associated with a least queued buffer.

The at least one memory and the computer program code may be configured to, with the at least one processor, cause the apparatus at least to allocate the one or more or more cells associated with the deactivated logical channel to an active logical channel associated with a highest sequence number of a packet.

The at least one memory and the computer program code may be configured to, with the at least one processor, cause the apparatus at least to allocate the one or more or more cells associated with the deactivated logical channel to an active logical channel associated with a lowest sequence number of a packet.

The at least one memory and the computer program code may be configured to, with the at least one processor, cause the apparatus at least to allocate the one or more or more cells associated with the deactivated logical channel to one or more active logical channels in dependence on a predefined mapping between said logical channels.

The at least one memory and the computer program code may be configured to, with the at least one processor, cause the apparatus at least to allocate the one or more or more cells associated with the deactivated logical channel to one or more active logical channels in dependence on a number of cells associated with one or more active logical channels of said plurality of logical channels configured for packet duplication.

The at least one memory and the computer program code may be configured to, with the at least one processor, cause the apparatus at least to allocate the one or more or more cells associated with the deactivated logical channel to:
  a. an active logical channel associated with highest number of allowed cells; or
  an active logical channel associated with a lowest number of allowed cells The at least one memory and the computer program code may be configured to, with the at least one processor, cause the apparatus at least to allocate the one or more or more cells associated with the deactivated logical channel to an active logical channel associated with highest number of allowed cells.

The at least one memory and the computer program code may be configured to, with the at least one processor, cause the apparatus at least to allocate the one or more or more cells associated with the deactivated logical channel to an active logical channel associated with a lowest number of allowed cells The at least one memory and the computer program code may be configured to, with the at least one processor, cause the apparatus at least to allocate the one or more cells associated with the deactivated logical channel to one or more active logical channels in dependence on a number of carriers in a given band associated with one or more active logical channels of said plurality of logical channels configured for packet duplication.

The at least one memory and the computer program code may be configured to, with the at least one processor, cause the apparatus at least to allocate the one or more or more cells associated with the deactivated logical channel to:
  a. an active logical channel associated with most number of carriers; or
  b. an active logical channel associated with a lowest number of carriers.

The at least one memory and the computer program code may be configured to, with the at least one processor, cause the apparatus at least to allocate the one or more or more cells associated with the deactivated logical channel to an active logical channel associated with most number of carriers.

The at least one memory and the computer program code may be configured to, with the at least one processor, cause the apparatus at least to allocate the one or more or more cells associated with the deactivated logical channel to an active logical channel associated with a lowest number of carriers.

The at least one memory and the computer program code may be configured to, with the at least one processor, cause the apparatus at least to allocate the one or more or more cells associated with the deactivated logical channel to one or more active logical channels in dependence one or more of the following: the logical channel priority; the prioritized bit rate; and the channel access priority class.

The at least one memory and the computer program code may be configured to, with the at least one processor, cause the apparatus at least to allocate the one or more cells associated with the deactivated logical channel to an active logical channel associated with a same cell group as the deactivated logical channel.

The at least one memory and the computer program code may be configured to, with the at least one processor, cause the apparatus at least to receive information indicating that one or more of the deactivated logical channels is to be activated and reallocating the one or more cells previously associated with that respective logical channel to that respective logical channel.

The at least one memory and the computer program code may be configured to, with the at least one processor, cause the apparatus at least to receive information indicating that at least one of a plurality of logical channels configured for packet duplication is to be deactivated and in response thereto determine that the respective logical channel is to be deactivated.

A communications device comprising the apparatus as previously described may be provided.

According to an aspect, there is provided an apparatus provided in a communications device, said apparatus comprising means for: determining that at least one of a plurality of logical channels configured for packet duplication is to be deactivated; and determining an allocation of one or more cells associated with the at least one deactivated logical channel to one or more active logical channels of said plurality of logical channels configured for packet duplication.

The active logical channel may be associated with an active radio link control entity. The active logical channel may be associated with an active leg. The means may be for determining the allocation using one or more preconfigured rules. The means may be for receiving the one or more preconfigured rules from a base station.

The means may be for allocating the one or more cells associated with the deactivated logical channel to a primary logical channel of the plurality of logical channels configured for packet duplication. The means may be for allocating the one or more cells associated with the deactivated logical channel to one or more active logical channels in dependence on a logical channel index of at least one of said plurality of logical channels configured for packet duplication.

The means may be for allocating the one or more cells associated with the deactivated logical channel to:
a. an active logical channel with a highest logical channel index;
b. an active logical channel with a lowest logical channel index;
c. an active logical channel with a next highest logical channel index to that of the deactivated logical channel; or
d. an active logical channel with a next lowest logical channel index to that of the deactivated logical channel.

The means may be for allocating the one or more cells associated with the deactivated logical channel to an active logical channel with a highest logical channel index. The means may be for allocating the one or more cells associated with the deactivated logical channel to an active logical channel with a lowest logical channel index. The means may be for allocating the one or more cells associated with the deactivated logical channel to an active logical channel with a next highest logical channel index to that of the deactivated logical channel. The means may be for allocating the one or more cells associated with the deactivated logical channel an active logical channel with a next lowest logical channel index to that of the deactivated logical channel.

The means may be for allocating the one or more cells associated with the deactivated logical channel to one or more active logical channels in dependence on activity associated with one or more active logical channels of said plurality of logical channels configured for packet duplication.

The means may be for allocating the one or more or more cells associated with the deactivated logical channel to:
a. an active logical channel associated with a most queued buffer;
b. an active logical channel associated with a least queued buffer;
c. an active logical channel associated with a highest sequence number of a packet; or
d. an active logical channel associated with a lowest sequence number of a packet.

The means may be for allocating the one or more or more cells associated with the deactivated logical channel to an active logical channel associated with a most queued buffer. The means may be for allocating the one or more or more cells associated with the deactivated logical channel to an active logical channel associated with a least queued buffer. The means may be for allocating the one or more or more cells associated with the deactivated logical channel to an active logical channel associated with a highest sequence number of a packet. The means may be for allocating the one or more or more cells associated with the deactivated logical channel to an active logical channel associated with a lowest sequence number of a packet. The means may be for allocating the one or more or more cells associated with the deactivated logical channel to one or more active logical channels in dependence on a predefined mapping between said logical channels.

The means may be for allocating the one or more or more cells associated with the deactivated logical channel to one or more active logical channels in dependence on a number of cells associated with one or more active logical channels of said plurality of logical channels configured for packet duplication. The means may be for allocating the one or more or more cells associated with the deactivated logical channel to:
a. an active logical channel associated with highest number of allowed cells; or
an active logical channel associated with a lowest number of allowed cells The means may be for allocating the one or more or more cells associated with the deactivated logical channel to an active logical channel associated with highest number of allowed cells.

The means may be for allocating the one or more or more cells associated with the deactivated logical channel to an active logical channel associated with a lowest number of allowed cells. The means may be for allocating the one or more cells associated with the deactivated logical channel to one or more active logical channels in dependence on a number of carriers in a given band associated with one or more active logical channels of said plurality of logical channels configured for packet duplication. The means may be for allocating the one or more or more cells associated with the deactivated logical channel to:
a. an active logical channel associated with most number of carriers; or
b. an active logical channel associated with a lowest number of carriers.

The means may be for allocating the one or more or more cells associated with the deactivated logical channel to an active logical channel associated with most number of carriers. The means may be for allocating the one or more or more cells associated with the deactivated logical channel to an active logical channel associated with a lowest number of carriers. The means may be for allocating the one or more or more cells associated with the deactivated logical channel to one or more active logical channels in dependence one or more of the following: the logical channel priority; the prioritized bit rate; and the channel access priority class. The means may for be for allocating the one or more cells associated with the deactivated logical channel to an active logical channel associated with a same cell group as the deactivated logical channel.

The means may be for receiving information indicating that one or more of the deactivated logical channels is to be activated and reallocating the one or more cells previously associated with that respective logical channel to that respective logical channel. The means may be for receiving information indicating that at least one of a plurality of logical channels configured for packet duplication is to be deactivated and in response thereto determine that the respective logical channel is to be deactivated. The means may be provided at least partially by circuitry.

A communications device comprising the apparatus as previously described may be provided.

According to an aspect, there is provided an apparatus provided in a communications device, said apparatus comprising: circuitry for determining that at least one of a plurality of logical channels configured for packet duplication is to be deactivated; and circuitry for determining an allocation of one or more cells associated with the at least one deactivated logical channel to one or more active logical channels of said plurality of logical channels configured for packet duplication.

According to an aspect, there is provided a method performed by an apparatus provided in a communications device, said method comprising: determining that at least one of a plurality of logical channels configured for packet duplication is to be deactivated; and determining an allocation of one or more cells associated with the at least one deactivated logical channel to one or more active logical channels of said plurality of logical channels configured for packet duplication.

The active logical channel may be associated with an active radio link control entity. The active logical channel may be associated with an active leg.

The method may comprise determining the allocation using one or more preconfigured rules. The method may comprise receiving the one or more preconfigured rules from a base station. The method may comprise allocating the one or more cells associated with the deactivated logical channel to a primary logical channel of the plurality of logical channels configured for packet duplication. The method may comprise allocating the one or more cells associated with the deactivated logical channel to one or more active logical channels in dependence on a logical channel index of at least one of said plurality of logical channels configured for packet duplication.

The method may comprise allocating the one or more cells associated with the deactivated logical channel to:
 a. an active logical channel with a highest logical channel index;
 b. an active logical channel with a lowest logical channel index;
 c. an active logical channel with a next highest logical channel index to that of the deactivated logical channel; or
 d. an active logical channel with a next lowest logical channel index to that of the deactivated logical channel.

The method may comprise allocating the one or more cells associated with the deactivated logical channel to an active logical channel with a highest logical channel index. The method may be for allocating the one or more cells associated with the deactivated logical channel to an active logical channel with a lowest logical channel index. The method may comprise allocating the one or more cells associated with the deactivated logical channel to an active logical channel with a next highest logical channel index to that of the deactivated logical channel. The method may be for allocating the one or more cells associated with the deactivated logical channel an active logical channel with a next lowest logical channel index to that of the deactivated logical channel. The method may comprise allocating the one or more cells associated with the deactivated logical channel to one or more active logical channels in dependence on activity associated with one or more active logical channels of said plurality of logical channels configured for packet duplication.

The method may comprise allocating the one or more or more cells associated with the deactivated logical channel to:
 a. an active logical channel associated with a most queued buffer;
 b. an active logical channel associated with a least queued buffer;
 c. an active logical channel associated with a highest sequence number of a packet; or
 d. an active logical channel associated with a lowest sequence number of a packet.

The method may comprise allocating the one or more or more cells associated with the deactivated logical channel to an active logical channel associated with a most queued buffer. The method may be for allocating the one or more or more cells associated with the deactivated logical channel to an active logical channel associated with a least queued buffer. The method may comprise allocating the one or more or more cells associated with the deactivated logical channel to an active logical channel associated with a highest sequence number of a packet. The method may comprise allocating the one or more or more cells associated with the deactivated logical channel to an active logical channel associated with a lowest sequence number of a packet. The method may comprise allocating the one or more or more cells associated with the deactivated logical channel to one or more active logical channels in dependence on a predefined mapping between said logical channels.

The method may comprise allocating the one or more or more cells associated with the deactivated logical channel to one or more active logical channels in dependence on a number of cells associated with one or more active logical channels of said plurality of logical channels configured for packet duplication. The method may comprise allocating the one or more or more cells associated with the deactivated logical channel to:
 a. an active logical channel associated with highest number of allowed cells; or
 an active logical channel associated with a lowest number of allowed cells The method may comprise allocating the one or more or more cells associated with the deactivated logical channel to an active logical channel associated with highest number of allowed cells. The method may comprise allocating the one or more or more cells associated with the deactivated logical channel to an active logical channel associated with a lowest number of allowed cells The method may comprise allocating the one or more cells associated with the deactivated logical channel to one or more active logical channels in dependence on a number of carriers in a given band associated with one or more active logical channels of said plurality of logical channels configured for packet duplication. The method may comprise allocating the one or more or more cells associated with the deactivated logical channel to:
 a. an active logical channel associated with most number of carriers; or
 b. an active logical channel associated with a lowest number of carriers.

The method may comprise allocating the one or more or more cells associated with the deactivated logical channel to an active logical channel associated with most number of carriers. The method may comprise allocating the one or more or more cells associated with the deactivated logical channel to an active logical channel associated with a lowest number of carriers. The method may comprise allocating the one or more or more cells associated with the deactivated logical channel to one or more active logical channels in dependence one or more of the following: the logical channel priority; the prioritized bit rate; and the channel access priority class. The method may comprise for allocating the one or more cells associated with the deactivated logical channel to an active logical channel associated with a same cell group as the deactivated logical channel. The method may comprise receiving information indicating that one or more of the deactivated logical channels is to be activated and reallocating the one or more cells previously associated with that respective logical channel to that respective logical channel. The method may comprise receiving information indicating that at least one of a plurality of logical channels configured for packet duplication is to be deactivated and in response thereto determine that the respective logical channel is to be deactivated.

According to an aspect there is provided a computer program comprising computer executable code which when run on at least one processor is configured to cause any of the previously described methods to be performed. According to an aspect, there is provided a computer readable medium comprising program instructions stored thereon for performing at least one of the above methods. According to an aspect, there is provided a non-transitory computer readable medium comprising program instructions stored thereon for performing at least one of the above methods. According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above. Various other aspects are also described in the following detailed description and in the attached claims.

BRIEF DESCRIPTION OF THE FIGURES

Embodiments will now be described, by way of example only, with reference to the accompanying Figures in which:

FIG. 2 shows a schematic diagram of an example mobile communication device;

FIG. 3 shows a schematic diagram of an example apparatus provided in a base station;

DETAILED DESCRIPTION OF THE FIGURES

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As is known, wireless systems can be divided into cells, and are therefore often referred to as cellular systems. Typically, an access point such as a base station provides at least one cell. The cellular system can support communications between user equipment (UE).

In the following, different exemplifying embodiments will be described using, as an example of an access architecture to which the embodiments may be applied, a radio access architecture based on long term evolution advanced (LTE Advanced, LTE-A) or new radio (NR) (or can be referred to as 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS) or any combination thereof.

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 to 5 to assist in understanding the technology underlying the described examples.

Figure 1:
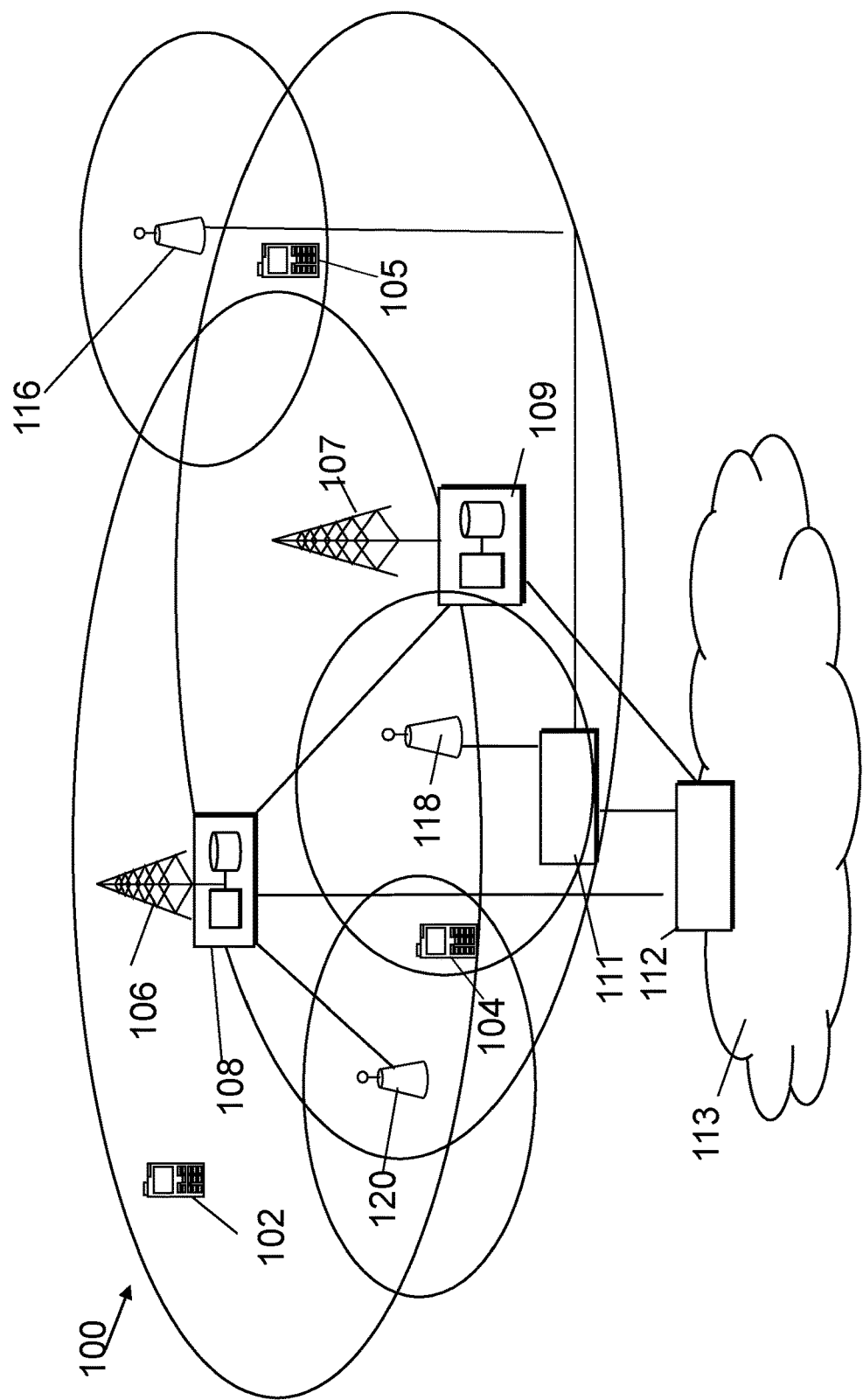
FIG. 1 shows a schematic diagram of an example communication system comprising a plurality of base stations and a communication device.

In a wireless communication system 100, such as that shown in FIG. 1, wireless communication devices, for example, user equipment (UE) or MTC (machine type communication) devices 102, 104, 105 are provided wireless access via at least one base station or similar wireless transmitting and/or receiving wireless infrastructure node or point. Such a node can be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity. In FIG. 1 control apparatus 108 and 109 are shown to control the respective macro level base stations 106 and 107. In some systems, the control apparatus may additionally or alternatively be provided in a separate entity.

In FIG. 1 base stations 106 and 107 are shown as connected to a wider communications network 113 via gateway 112. A further gateway function may be provided to connect to another network. The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. The communication devices will be referred to as a UE (user equipment) in this document but it should be appreciated that the device may be any suitable communications device and the term UE is intended to cover any such device. Some examples of communications devices are discussed below and as used in this document the term UE is intended to cover any one or more of those devices and/or any other suitable device.

FIG. 2 illustrates an example of a communications device 300, such as the wireless communications devices 102, 104 and 105 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302a. The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Communication protocols and/or parameters which shall be used for the connection are also typically defined. The communications devices may access the communication system based on various access techniques.

An example apparatus is shown in FIG. 3. FIG. 3 shows an example of an apparatus 200 for a base station. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Figure 4:
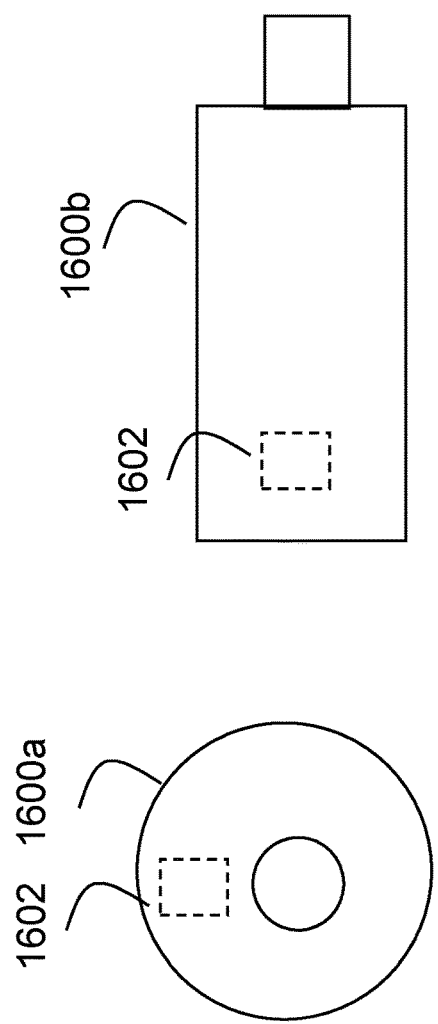
FIG. 4 shows a schematic representation of a non-volatile memory medium storing instructions which when executed by a processor allow a processor to perform one or more of the steps of the method of some embodiments

FIG. 4 shows a schematic representation of non-volatile memory media 1600a (e.g. computer disc (CD) or digital versatile disc (DVD)) and 1600b (e.g. universal serial bus (USB) memory stick) storing instructions and/or parameters 1602 which when executed by a processor allow the processor to perform one or more of the steps of any of the methods of any of the embodiments.

Figure 5:
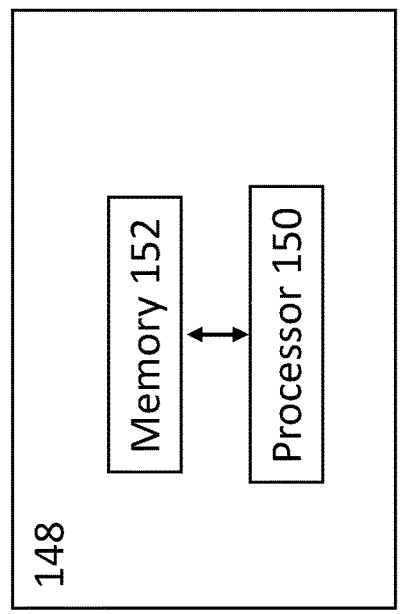
FIG. 5 shows an example apparatus which may be provided in a base station or a communications device.

FIG. 5 shows an apparatus 148. The apparatus 148 may be provided in the base station or in a communications device. The apparatus may comprise at least processor 150 and at least one memory 152 including computer code for one or more programs. This apparatus may be configured to cause some embodiments to be performed.

In some embodiments carrier aggregation and/or dual connectivity is used in conjunction with duplication of a link. Some embodiments may be provided in the relation to the so-called internet of things IoT or machine type communication scenarios. Some embodiments may be used with ultra-reliable low latency communication (URLLC) devices. Such devices may be used in MTC/IoT use cases (for example remote control, factory automation, automated guided vehicles etc.). Data duplication may improve latency and reliability in such scenarios. Other embodiments may be provided in other contexts. Those contexts may be in regular cellular communication scenarios or in any other suitable communication scenario. Data duplication may be provided. For example resource efficient PDCP (packet data convergence protocol) duplication may be provided. There may be coordination between nodes for PDCP duplication activation. The coordination may be such that unnecessary duplicate transmissions may be avoided and/or reduced. The connections can be e.g. connections to a plurality of base stations and/or plurality of carriers on separate frequencies (i.e. carrier aggregation). Data duplication is where the same data packets are transmitted through different base stations, radio heads and/or carriers etc.

It has been proposed to configure multiple component carriers (CCs) to a single user, where the CCs could belong to the same node (same cell group, CG). This enables carrier aggregation (CA) based PDCP duplication. Alternatively, the CCs could belong to different nodes (distinct cell groups). This provides dual connectivity (DC) based PDCP duplication. Carrier aggregation (CA) may be supported by a single MAC entity. Dual-connectivity may have separate MAC entities for both connections. CA and DC may be used together in some embodiments or as alternatives in other embodiments. In some embodiments only one of DC and CA is supported. In other embodiments, both of DC and CA are supported, wherein CA-based duplication can be configured in each of the nodes for DC-based duplication.

In some embodiments, there may be a number k of legs configured for a radio bearer for purposes of data duplication. A transmission leg may be a RLC entity that corresponds to a LCH, which can be configured with a set of allowed serving cells. Hence, a radio bearer can have k LCHs when duplication is configured. In some embodiments there may be a maximum number n≤k of legs which may be active at a time. The number of active legs may be the same as or different to the number of configured legs in some embodiments. A leg can be activated or deactivated. Some embodiments may be used in an uplink scenario and/or a downlink scenario.

Logical Channel (LCH) to cell restriction may be provided to prevent mapping of LCHs of the same radio bearer to the same cell. The radio bearer having more than one LCH may be used for duplication purposes. If the LCH were to be mapped to the same cell, the benefit from duplication may be small in some situations. A LCH could be defined by the type of information it carries and is generally classified as a control channel, used for transmission of control and configuration information, or as a traffic channel, used for the user data.

The duplication may also be referred to as Packet Data Convergence Protocol (PDCP) duplication or simply data packet duplication. Duplication at PDCP consists of submitting the same PDCP PDUs multiple times: once to each activated transmission leg. In carrier aggregation (CA) duplication, the LCHs of a duplicated radio bearer may be mapped to different serving cells or carriers. CA duplication may refer to PDCP CA duplication or CA packet duplication. Packet duplication may refer to duplication of control and/or user plane packets.

The case of two logical channels in packet duplication will now be described. When duplication is configured for a radio bearer by RRC (radio resource control), a secondary RLC entity is added to the radio bearer to handle the duplicated PDCP PDUs. The logical channel corresponding to the primary RLC entity is referred to as the primary logical channel, and the logical channel corresponding to the secondary RLC entity, the secondary logical channel. The two RLC entities have the same RLC mode. Duplication at PDCP therefore consists in submitting the same PDCP PDUs twice: once to the primary RLC entity and a second time to the secondary RLC entity. Some embodiments may be used to support packet duplication even when there is more than one secondary logical channel. In some embodiments, packet duplication refers to PDCP Protocol Data Unit (PDU) duplication.

When duplication is deactivated for a radio bearer, the cell restrictions may be lifted so that the remaining LCH of the radio bearer may use any cell as in normal operation (e.g. as in normal CA operation if duplication is utilized with CA before deactivation). When duplication is deactivated, some embodiments may apply a union of serving cells originally allowed for particular duplication legs, to a transmission leg, which remains activated after duplication deactivation.

Some embodiments may be used where there may be up to 4 active legs. However, this is by way of example only and other embodiments may have more or less than four active legs. In some embodiments, the number of configured legs for duplication may be larger or the same as the number of active legs used for duplication.

It has been proposed for I-IoT (Industrial Internet of the things) that up to 4 active legs are supported. For example, in particular, I-IoT in Rel-16 it has been agreed that a subset of active legs can be dynamically selected.

Some embodiments may provide one or more methods which may avoid the need to require additional RRC configurations of LCP settings (applicable to different situations) and/or dynamic signaling, which may result in higher complexity and signaling overheads.

Figure 6:
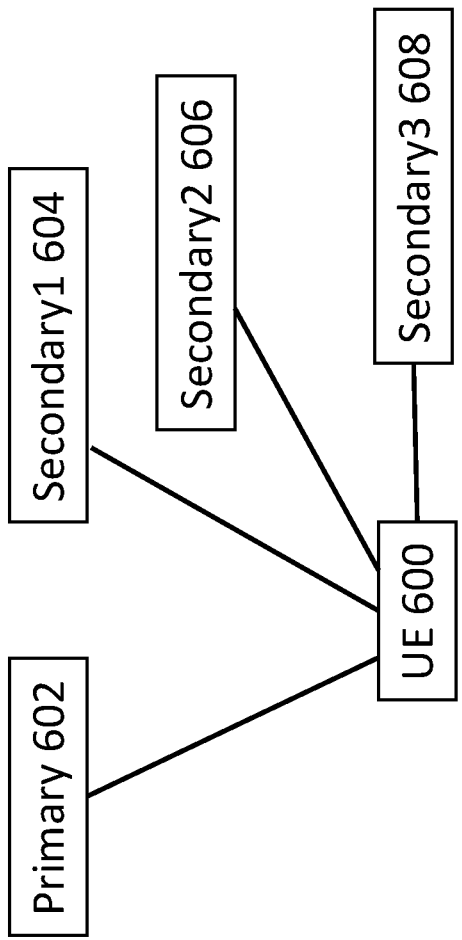
FIG. 6 shows an example of a communications device with four active legs.

Reference is made to FIG. 6 which shows a UE 600 with four active legs. A first leg is a primary leg 600. The second, third and fourth legs 604, 606 and 608 are secondary legs. The primary leg may be associated with a primary cell PCell and the secondary legs may be associated with secondary cells SCells. In some embodiments, one or more of these legs may be deactivated. (It should be appreciated that in use, one or more of the legs may switch from one cell to another.)

In some embodiments, an apparatus of the UE may be configured to autonomously re-allocate the allowed serving cells across legs configured for duplication, upon different activation states of the legs. The gNB may pre-configure how the allowed serving cells should be re-allocated when one leg/RLC entity is deactivated. The UE will then operate in accordance with this pre-configuration when a leg is deactivated. The re-allocation will result in moving the allowed serving cells of a de-activated leg to another leg that is still active. The "another leg" will combine its own allowed serving cell set with the one that is moved from the de-activated leg. In some embodiments, the apparatus of the UE may be provided with one or more rules to perform this re-allocation. The apparatus may be for example as shown in FIG. 5 and/or may be provided by suitable circuitry. In some embodiments, the apparatus of the UE may be provided with a default behavior which it applies. In some embodiments, the apparatus of the UE may be configured to apply the default behavior unless the UE receives a message from the base station which overrides the default behavior. In some embodiment, the apparatus of the UE may be configured to cause one or more allowed cells of a deactivated leg to be applied to one of the remaining active legs. This may for example be the case when there are more than two legs per DRB configured for CA duplication.

How the allowed cells are re-allocated by the apparatus of the UE upon deactivation of any leg can be based on one or more of the following options. In one option, all of the allowed cells of all the deactivated leg(s) are applied to the primary leg. Those allowed cells of the deactivated leg are considered as allowed cells for the primary leg. This may be used where a primary leg is defined. A primary leg may be the one on which control information is provided. In another option all of the allowed cells of the deactivated leg(s) are applied to the one or more of the remaining active leg(s) with the lowest LCH (logical channel)/RLC (radio link control) entity index for the radio bearer. In another option all of the allowed cells of the deactivated leg(s) are applied to the one or more of the remaining active leg(s) with the highest LCH (logical channel)/RLC (radio link control) entity index for the radio bearer.

Alternatively or additionally, when a leg is deactivated, the allowed cells of the leg are applied to the remaining active leg with the next lower LCH/RLC entity index (from the deactivated leg) for the radio bearer. For example, if the LCH index for the deactivated leg is #2 and the remaining active legs have LCH indices of #0, #1, #3, the allowed cells are applied to the leg with LCH index #1 (next lower). Alternatively or additionally, when a leg is deactivated, the allowed cells of the leg are applied to the remaining active leg with next higher LCH/RLC entity index (from the deactivated leg) for the radio bearer. For example, if the LCH index for the deactivated leg is #2 and the remaining active legs have LCH indices of #0, #1, #3, the allowed cells are applied to the leg with LCH index #3 (next higher).

In another option, all the allowed cells of the deactivated legs are applied to the remaining active leg with the most queued (or busiest) buffer. In another option, all the allowed cells of the deactivated legs are applied to the remaining active leg with the least queued buffer. In another option, all the allowed cells of the deactivated legs are applied to the remaining active leg with the most lagging in terms of the sequence number of the packet currently being processed. In another option, all the allowed cells of the deactivated legs are applied to the remaining active leg with the least lagging in terms of the sequence number of the packet currently being processed. In another option, there may be pre-configurable association between legs. This association will provide a mapping to indicate which remaining active leg can use the allowed cells of a de-activated leg. This mapping will be pre-configured. For example, LCH #0 is associated to LCH #2, and LCH #1 is associated to LCH #3. When LCH #0 is de-activated, its allowed serving cells should be applied to LCH #2 based on the pre-configured association. When LCH #3 is de-activated, its allowed serving cells should be applied to LCH #1 based on the pre-configured association. In another option, all the allowed cells of the deactivated legs are applied to the remaining active leg(s) that has the least allowed cells associated with it.

In another option, all the allowed cells of the deactivated legs are applied to the remaining active leg(s) that has the most allowed cells associated with it. In another option, all the allowed cells of the deactivated legs are applied to the remaining active leg(s) which have a respective allowed serving cells comprising the most carriers in unlicensed band. In another option, all the allowed cells of the deactivated legs are applied to the remaining active leg(s) which have a respective allowed serving cells comprising the least carriers in unlicensed band. In another option, all the allowed cells of the deactivated legs are applied to the remaining active leg(s) which have a respective allowed serving cells comprising the most carriers in Frequency Range 2 (FR2) (24.25 GHz-52.6 GHz). In another option, all the allowed cells of the deactivated legs are applied to the remaining active leg(s) which have a respective allowed serving cells comprising the least carriers in Frequency Range 2 (FR2).

In some embodiments, the selection of the remaining active leg may be based on at least one parameter of the associated LCH configuration. For example, the remaining active leg may be selected based on one or more of the following: the highest LCH priority, the lowest LCH priority, the highest PBR (prioritized bit rate), the lowest PBR, the lowest CAPC (channel access priority class), and the lowest CAPC. This option may be used in the case where the LCHs associated to the same DRB are configured with different LCP (logical channel prioritization) settings.

Some embodiments may involve more than one cell groups. In such cases, the selection of the remaining active leg may be confined to the same cell group that the de-activated leg is associated to, combining with any of the options listed above.

When duplication is configured using both DC and CA, when a gNB deactivates one or more of the legs in one CG, but there is still one or more legs remaining in this CG, then that remaining one or more remaining legs of the same CG should have priority for taking over the serving cells of the other legs. Some embodiments may therefore involve more than one cell groups and, in such cases, the selection of the remaining active leg may be confined to the same cell group that the de-activated leg is associated with, combining with any of the options listed above. This may avoid situations where the primary leg or leg chosen based any one or more of the previously described options are on different CG than the deactivated leg.

In some embodiments, the network may configure, in the combined DC and CA duplication case, a primary leg for each CG. Only one of those legs may be a primary leg from the PDCP point of view. The other primary leg would be treated as such when there is deactivation within the same cell group. In some embodiments, the UE may be pre-configured (e.g. on a per-DRB basis) regarding which option above should be applied upon leg deactivation. The UE may be pre-configured with associated parameters. Such pre-configuration may provide a framework for the UE to determine how one or more allowed serving cells should be re-allocated when one or more of the legs is deactivated. In other embodiments, the UE behavior may be defined for such situations such that no pre-configuration is needed. In some embodiments, a combination of pre-configuration of the UE and defined UE behavior may be provided. When a deactivated duplication leg is activated again, it may retrieve its allowed serving cells based on the original RRC configurations.

In some embodiments, one or more parameters may be used by the apparatus of the UE when determining which one of a plurality of different options is to be provided. In some embodiments, the re-allocation of the serving cells to one the legs as proposed in any of the previous exemplary embodiments, is valid only as long as the leg from which the serving cells were re-allocated remains deactivated for duplication. When the deactivated leg becomes active, the re-allocation is stopped. In some embodiments, activation or deactivation of legs for a radio bearer is not controlled by the gNB, but rather determined by the UE itself based on certain configured criteria or implementation issues.

Figure 7:
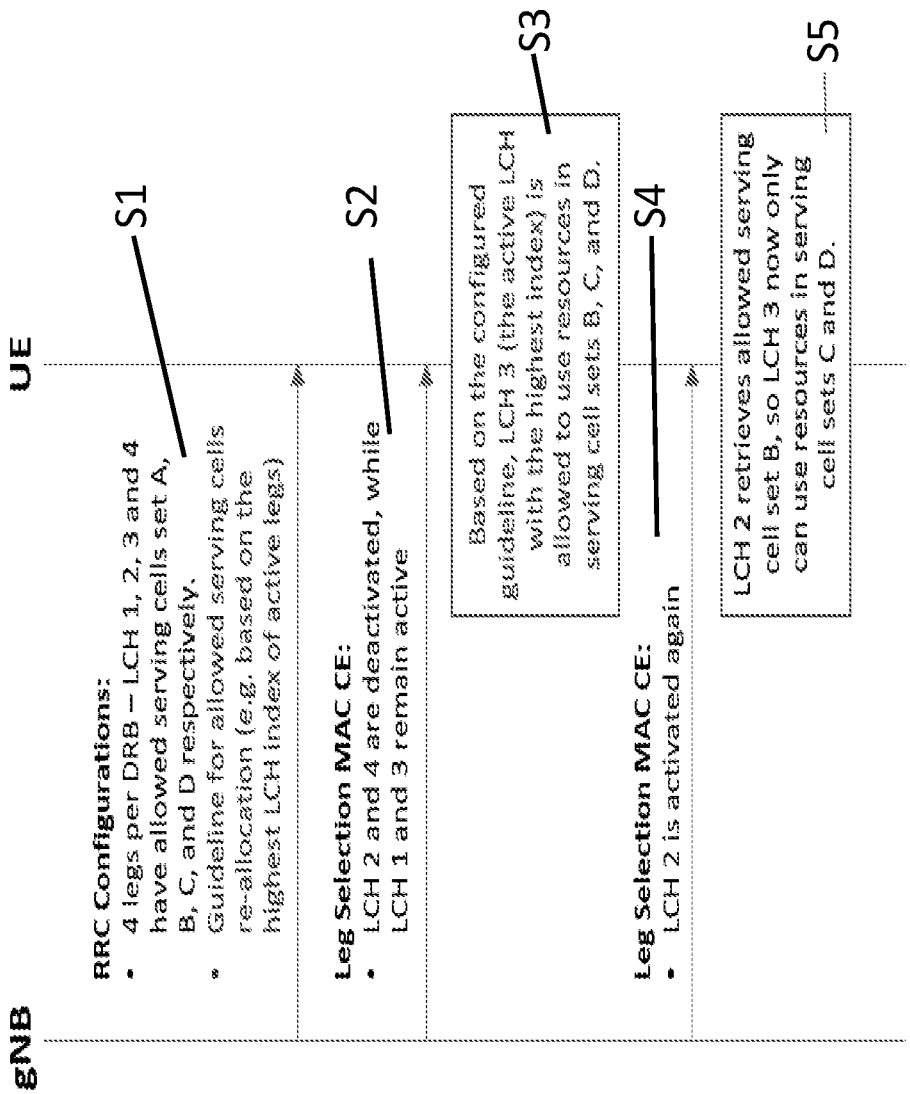
FIG. 7 shows a signalling flow of some embodiments.

Reference is made to FIG. 7 which shows an example of a signal flow of some embodiments using one of the options discussed previously. It should be appreciated that other of the options previously described may alternatively be provided.

In step S1, the gNB is configured to send to the user equipment configuration information. The configuration information may be RRC configuration information. The configuration information may comprise information about the different legs. By way of example only, there may be four legs per DRB. These may be LCH1, LCH2, LCH 3 and LCH 4. Each logical channel LCH may be associated with an allowed serving cell set A, set B, set C and set D respectively. In this example, the RRC configuration information may comprise a guideline for allowed serving cell re-allocation. For example, this may be based on the highest LCH index of the active legs. In other embodiments, this may be based on any one or more of the previously described options.

In step S2, the gNB may send a MAC CE which instructs the UE to activate/deactivate one or more of the legs configured for a radio bearer to the UE. This may indicate that LCH 2 and 4 are deactivated and/or indicate that LCH 1 and 3 remain active. In other embodiments, one or more of the LCH are to be deactivated. This may be indicated in any suitable way. This may be via a MAC CE or in any other suitable manner.

In step S4, the UE is configured to use the guideline from the gNB. In this example, LCH3 is the active LCH with the highest index and is allowed to use resources in serving cell sets B, C and D, wherein serving cell set B and D are moved from deactivated legs LCH2 and LCH4 respectively, while serving cell C was originally configured for LCH3 itself.

In step S5, the gNB sends a leg selection MAC CE to the UE indicating for example that LCH2 is active again. In other embodiments gNB may send an indication to the UE indicating that one or more of the inactive legs (this may be a configured but inactive leg) is active again. This may be indicated using a MAC CE or in any other suitable manner.

In step S6, the UE is configured such that LCH2 uses serving cell set B, because it is what has been configured for LCH2 originally. LCH 3 is now limited to using resources in serving cell sets C and D, as set B is moved back to LCH2 which was activated in step S5. When a leg is activated again, the serving cell used by that leg may be allocated back to that leg and removed from another leg to which that cell had been reallocated on deactivation of that leg. This may undo the reallocation performed when that leg is deactivated.

Some embodiments may be used where there are more than two legs with CA duplication. This may allow the remaining leg to use allowed cells of a deactivated leg. This may enhance resource efficiency and scheduling flexibility.

Figure 8:
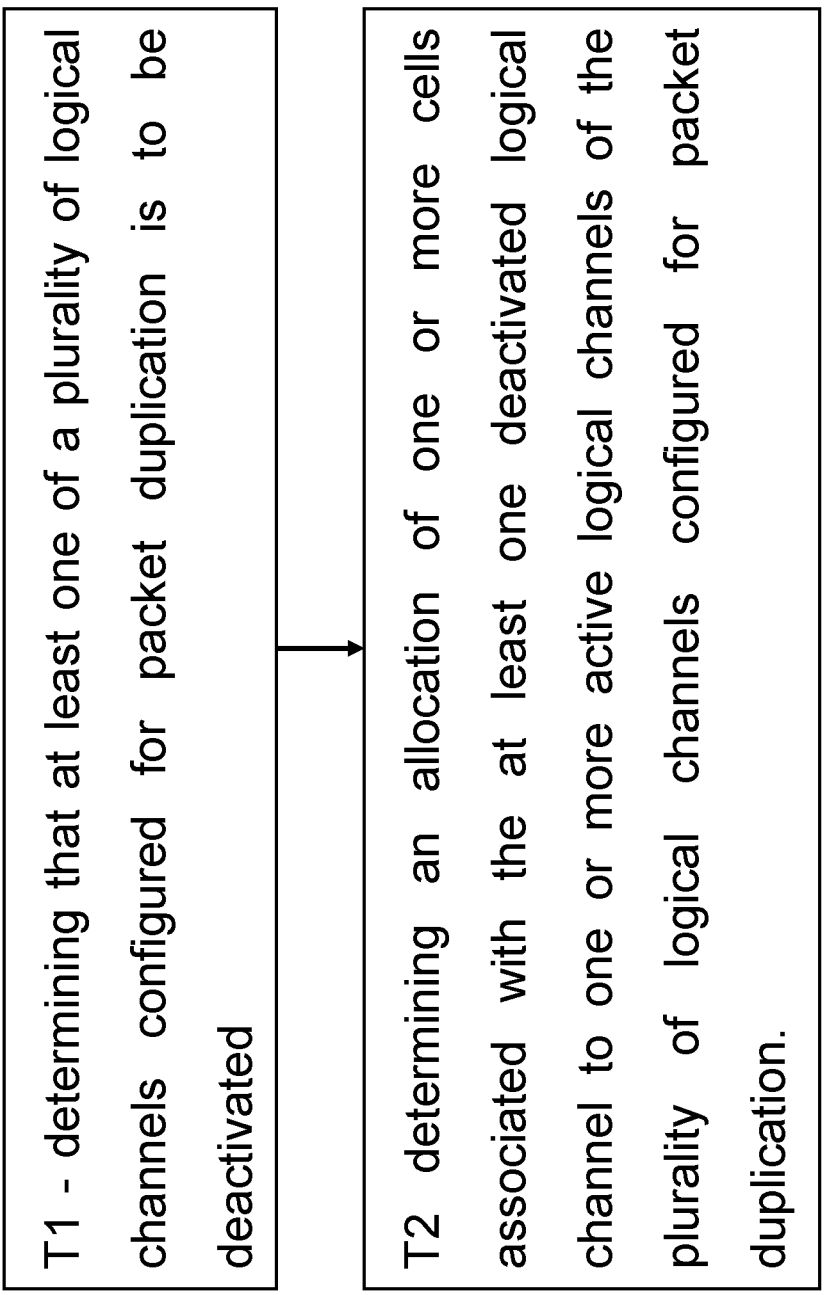
FIG. 8 shows a method of some embodiments that may be performed by an apparatus provided in a communications device

Reference is made to FIG. 8 which shows a method of some embodiments. The method may be performed by an apparatus provided in a communications device.

In step T1, the method comprises determining that at least one of a plurality of logical channels configured for packet duplication is to be deactivated. In step T2, the method may comprise determining an allocation of one or more cells associated with the at least one deactivated logical channel to one or more active logical channels of said plurality of logical channels configured for packet duplication.

The determining of the allocation may use any one or more of the previously described options. Different options may be used for the allocation of the cells of different ones of a plurality of deactivated logical channels It is noted that while the above describes example embodiments, there are several variations and modifications which may be made to the disclosed solution without departing from the scope of the present invention. In particular, different embodiments have been described. Different features from different embodiments may be combined.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device. As used in this application, the term "circuitry" may refer to one or more or all of the following:

(a) hardware-only circuit implementations (such as implementations in only analogue and/or digital circuitry);
(b) combinations of hardware circuits and software, such as:
a combination of analogue and/or digital hardware circuit(s) with software/firmware and (c) (ii) any portions of hardware processor(s) with software (including digital signal processor(s)), software, and memory(ies) that work together to cause an apparatus, such as the communications device or base station to perform the various functions previously described; and
(d) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
   at least one processor; and
   at least one memory including computer codes for one or more programs, the at least one memory and the computer codes being configured, with the at least one processor, to cause the apparatus at least to:
   determine that at least one logical channel, of a plurality of logical channels configured for packet duplication when active, is to be deactivated, wherein two or more of the plurality of logical channels are to remain active for the packet duplication after deactivation of the at least one logical channel of the plurality of logical channels; and
   determine an allocation of one or more cells associated with the at least one deactivated logical channel for use by one or more active logical channels of the two or more of the plurality of logical channels that remain active for packet duplication after deactivation of the at least one logical channel.

2. The apparatus as claimed in claim 1, wherein the at least one memory and the computer program code are further configured to, with the at least one processor, cause the apparatus at least to:
   determine the allocation using one or more preconfigured rules.

3. The apparatus as claimed in claim 2, wherein the at least one memory and the computer program code are further configured to, with the at least one processor, cause the apparatus at least to:
   receive the one or more preconfigured rules from a base station.

4. The apparatus as claimed in claim 1, wherein the at least one memory and the computer program code are further configured to, with the at least one processor, cause the apparatus at least to:

allocate the one or more cells associated with the at least one deactivated logical channel to a primary logical channel of the plurality of logical channels configured for packet duplication.

5. The apparatus as claimed in claim 1, wherein the at least one memory and the computer program code are further configured to, with the at least one processor, cause the apparatus at least to:
allocate the one or more cells associated with the at least one deactivated logical channel to one or more active logical channels based at least on a logical channel index of at least one of said plurality of logical channels configured for packet duplication.

6. The apparatus as claimed in claim 1, wherein the at least one memory and the computer program code are further configured to, with the at least one processor, cause the apparatus at least to:
allocate the one or more cells associated with the at least one deactivated logical channel to:
an active logical channel with a highest logical channel index;
an active logical channel with a lowest logical channel index;
an active logical channel with a next highest logical channel index to that of the at least one deactivated logical channel; or
an active logical channel with a next lowest logical channel index to that of the at least one deactivated logical channel.

7. The apparatus as claimed in claim 1, wherein the at least one memory and the computer program code are further configured to, with the at least one processor, cause the apparatus at least to:
allocate the one or more cells associated with the at least one deactivated logical channel to one or more active logical channels based at least on activity associated with one or more active logical channels of said plurality of logical channels configured for packet duplication.

8. The apparatus as claimed in claim 1, wherein the at least one memory and the computer program code are further configured to, with the at least one processor, cause the apparatus at least to:
allocate the one or more cells associated with the at least one deactivated logical channel to:
an active logical channel associated with a most queued buffer;
an active logical channel associated with a least queued buffer;
an active logical channel associated with a highest sequence number of a packet; or
an active logical channel associated with a lowest sequence number of a packet.

9. The apparatus as claimed in claim 1, wherein the at least one memory and the computer program code are further configured to, with the at least one processor, cause the apparatus at least to:
allocate the one or more cells associated with the at least one deactivated logical channel to one or more active logical channels based at least on a predefined mapping between said logical channels.

10. The apparatus as claimed in claim 1, wherein the at least one memory and the computer program code are further configured to, with the at least one processor, cause the apparatus at least to:
allocate the one or more cells associated with the at least one deactivated logical channel to one or more active logical channels based at least on a number of cells associated with one or more active logical channels of said plurality of logical channels configured for packet duplication, such that the one or more cells associated with the deactivated logical channel are allocated to:
an active logical channel associated with highest number of allowed cells; or
an active logical channel associated with a lowest number of allowed cells.

11. The apparatus as claimed in claim 1, wherein the at least one memory and the computer program code are further configured to, with the at least one processor, cause the apparatus at least to:
allocate the one or more cells associated with the at least one deactivated logical channel to one or more active logical channels based at least on a number of carriers in a given band associated with the one or more active logical channels of said plurality of logical channels configured for packet duplication such that the one or more cells associated with the at least one deactivated logical channel are allocated to:
an active logical channel associated with most number of carriers; or
an active logical channel associated with a lowest number of carriers.

12. The apparatus as claimed in claim 1, wherein the at least one memory and the computer program code are further configured to, with the at least one processor, cause the apparatus at least to:
allocate the one or more cells associated with the at least one deactivated logical channel to one or more active logical channels based at least on one or more of the following: the logical channel priority; the prioritized bit rate; or the channel access priority class.

13. The apparatus as claimed in claim 1, wherein the at least one memory and the computer program code are further configured to, with the at least one processor, cause the apparatus at least to:
allocate the one or more cells associated with the at least one deactivated logical channel to an active logical channel associated with a same cell group as the at least one deactivated logical channel.

14. The apparatus as claimed in claim 1, wherein the at least one memory and the computer program code are further configured to, with the at least one processor, cause the apparatus at least to:
receive information indicating that one or more of the at least one deactivated logical channels is to be activated; and
upon reactivation of the at least one deactivated logical channel, reallocating the one or more cells previously associated with respective logical channels of the at least one deactivated logical channel to the respective logical channels of the at least one deactivated logical channel.

15. The apparatus as claimed in claim 1, wherein the at least one memory and the computer program code are further configured to, with the at least one processor, cause the apparatus at least to:
receive information indicating that the at least one logical channel of a plurality of logical channels configured for packet duplication is to be deactivated; and
based at least upon said information, determine that the at least one logical channel is to be deactivated.

16. The apparatus as claimed in claim 1, wherein a plurality of logical channels remains active for the packet duplication after deactivation of the at least one logical channel of the plurality of logical channels configured for packet duplication.

17. The apparatus as claimed in claim 1, wherein the packet duplication comprises a dual connectivity-based packet duplication and a carrier aggregation-based packet duplication in each of at least two cell groups of the dual connectivity-based packet duplication.

18. The apparatus as claimed in claim 1, wherein a carrier aggregation-based packet duplication is supported by a single medium access control entity.

19. A method performed by an apparatus provided in a communications device, said method comprising:
   determining that at least one logical channel, of a plurality of logical channels configured for packet duplication when active, is to be deactivated, wherein two or more of the plurality of logical channels are to remain active for the packet duplication after deactivation of the at least one logical channel of the plurality of logical channels; and
   determining an allocation of one or more cells associated with the at least one deactivated logical channel for use by one or more active logical channels of the two or more of the plurality of logical channels that remain active for packet duplication after deactivation of the at least one logical channel.

20. A non-transitory computer readable medium comprising program instructions stored thereon which when run on at least one processor cause an apparatus at least to:
   determine that at least one logical channel, of a plurality of logical channels configured for packet duplication when active, is to be deactivated, wherein two or more of the plurality of logical channels are to remain active for the packet duplication after deactivation of the at least one logical channel of the plurality of logical channels; and
   determine an allocation of one or more cells associated with the at least one deactivated logical channel for use by one or more active logical channels of the two or more of the plurality of logical channels that remain active for packet duplication after deactivation of the at least one logical channel.

\* \* \* \* \*